United States Patent [19]

Bertram

[11] Patent Number: 5,450,659
[45] Date of Patent: Sep. 19, 1995

[54] SAFETY CLAMP FOR HOLDING AN ANIMAL TRAP AGAINST INADVERTENT ACTUATION

[76] Inventor: Bruce H. Bertram, Box 172, Birtle, Manitoba, Canada, R0M 0C0

[21] Appl. No.: 296,901

[22] Filed: Aug. 29, 1994

[51] Int. Cl.⁶ ............................................. A44B 21/00
[52] U.S. Cl. ................................. 24/523; 24/522; 24/527
[58] Field of Search ............... 24/523, 522, 524, 525, 24/526, 527, 459, 495

[56] References Cited

U.S. PATENT DOCUMENTS

| | | | |
|---|---|---|---|
| 2,439,430 | 4/1948 | Hurd | 24/523 |
| 4,536,926 | 8/1985 | Pantaleo | 24/523 |
| 4,583,269 | 4/1986 | Harris | 24/523 |
| 4,773,131 | 9/1988 | Koza | 24/523 |

*Primary Examiner*—Victor N. Sakran
*Attorney, Agent, or Firm*—Adrian D. Battison; Stanley G. Ade; Murray E. Thrift

[57] ABSTRACT

A safety clamp for mounting on wires of an animal trap to hold the trap against inadvertent actuation comprises a pair of flat plates arranged in spaced parallel position and squeezable together against resistance from a coil spring positioned there between. Each plate carries a hook member with a straight portion having one end welded to the respective squeeze plate and extending therefrom at a right angle through a hole in the other squeeze plates to a hook portion beyond the other squeeze plate. The hook members are parallel and closely spaced so that the coil spring is wrapped around the two hook members in their position between the squeeze plates. Two further hook portions are mounted on one side of the squeeze plates and extend inwardly between the squeeze plates. The hook portions are engaged over wires of the trap and are held in place by the spring action pulling the hook portions together.

10 Claims, 2 Drawing Sheets

SAFETY CLAMP FOR HOLDING AN ANIMAL TRAP AGAINST INADVERTENT ACTUATION

This invention relates to a safety clamp for mounting on an animal trap to hold the trap against inadvertent actuation while the trap is being set.

BACKGROUND OF THE INVENTION

It has become more important in the trapping business in recent years to increase the spring action of an animal trap so that the amount of force applied to the animal when the trap is actuated is sufficient to cause death rapidly rather than to allow the animal to suffer over a prolonged period. In addition further types of traps have been developed again with the intention of causing rapid death of the animal. These increased spring forces make the traps more dangerous to the persons setting the trap since inadvertent actuations of the trap while it is being set can cause at least a painful snap against the fingers of other body parts of the person and in some causes can cause a serious break in the bones of the person. Traps necessarily are very sensitive in order to allow actuation on delicate movement caused by the animal to be trapped.

Many types of traps include a pair of wires which are located closely adjacent when the trap is being set and then move rapidly apart when the trap is actuated. There are therefore devices presently on the market place which include a pair of hooks engagable over the adjacent parallel wires to hold those wires in their adjacent positions while the trap is set to insure that the trap cannot actuate inadvertently. One device presently available comprises an elongate shaft at one end which is provided a hook. A second hook member is slidable along the shaft and is spring biased toward the first hook at the end of the shaft. The operator therefore in placing the safety device over the trap, slides the second hook member along the shaft to increase the distance between the hook members and then engages the hook members around the two parallel wires. The spring action pushes the hook members together so that the hook members engage and hold the wires in the spaced position. Should the trap actuate inadvertently, the trap pushes the hook members apart against the spring action until the second hook member engages a stop thus preventing further movement of the two wires.

However this device is difficult to operate in that it is difficult to align the two hook members and in that the second hook member which slides along the shaft is difficult to move when wearing winter clothing.

SUMMARY OF THE INVENTION

According to one aspect of the invention there is provided an improved safety clamp of the above type which is simple and easy to operate even when wearing heavy mitts in that it can be effected simply by squeezing action between to squeeze plates.

According to the invention, therefore, there is provided a safety clamp for mounting on an animal trap to hold the trap against in advertent actuation while the trap is being set, the safety clamp comprising a first squeeze plate, a second squeeze plate, the first and second squeeze plates being mounted in spaced generally parallel arrangement for movement together in a squeezing action effected by manual pressure on outside surfaces of the squeeze plates, a first hook member, a second hook member, each of the hook members having a first portion with one end of the first portion attached to an inside surface of a respective one of the squeeze plates and with the first portion extending substantially at a right angle to the respective squeeze plate across the space between the squeeze plates through an opening in the other of the squeeze plates, and each hook member having a hook portion at an end thereof opposite said one end so that the hook portion is arranged on a side of the other squeeze plate opposite said respective squeeze plate such that said squeezing action moves said one ends of the hook members together to increase the spacing between the hook portions for engaging over portions of the trap, and spring means biasing the squeeze plates apart against the squeezing action.

One embodiment of the invention will now be described in conjunction with the accompanying drawings in which;

BRIEF DESCRIPTION OF THE DRAWINGS

In the drawings like characters of reference indicate corresponding parts in the different figures.

DETAILED DESCRIPTION

Figure 1:
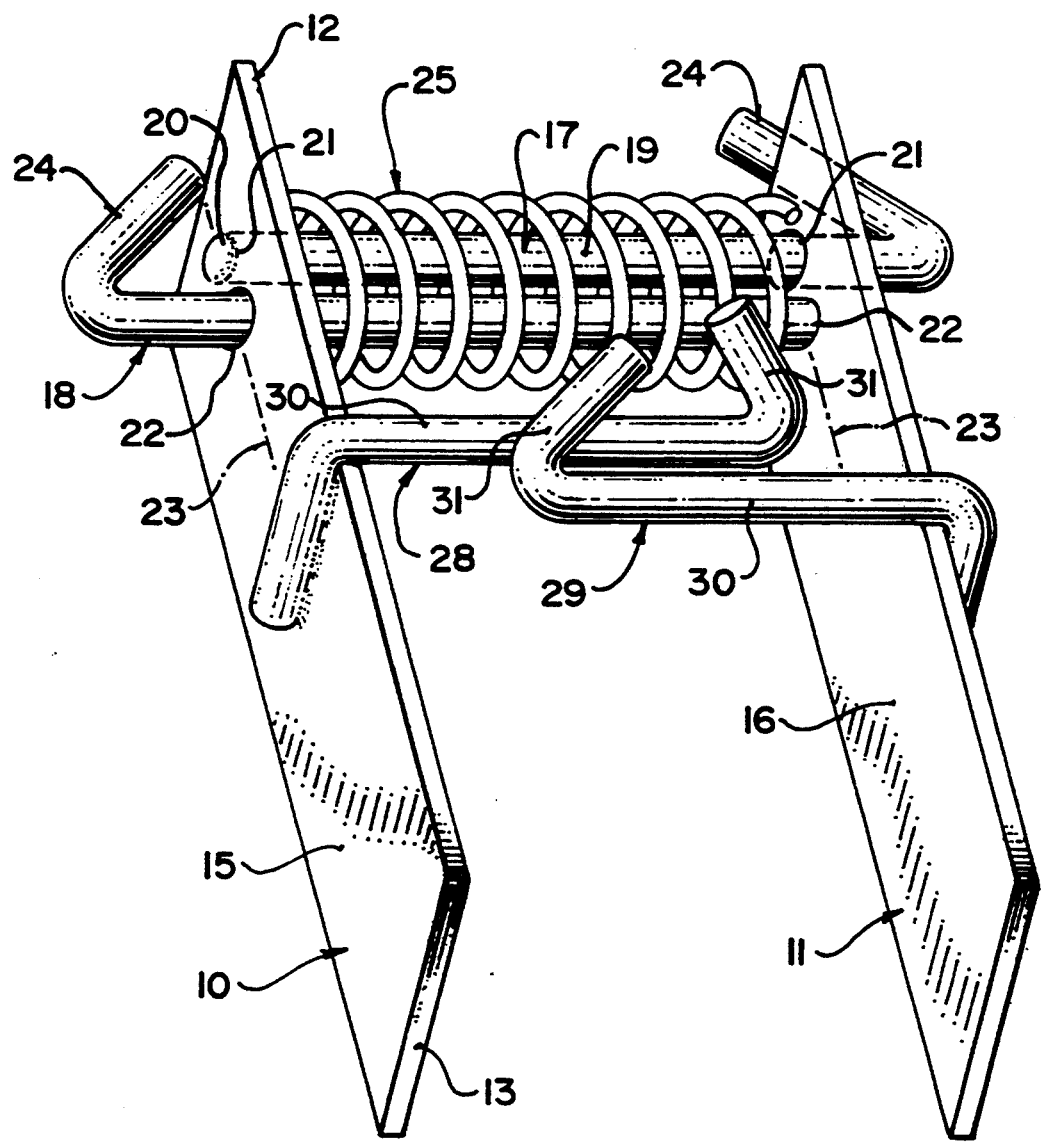
FIG. 1 is an isometric view of the safety clamp according to the present invention.

The safety clamp of the present invention comprises a pair of squeeze plates 10 and 11 each of which is comprised of a flat rectangular plate having a first end 12 and a second end 13, The two plates 10 and 11 are arranged in parallel spaced position and directly aligned and of equal length and width so as to form a symmetrical arrangement. Each plate includes an outside surface 15 and an inside surface 16.

The device further includes two hook members 17 and 18. Each hook member includes a first straight portion having a first end 20 fastened to a respected one of the squeeze plates 10 and 11, The end 20 is engaged through hole in the respective squeeze plate and is spot welded to the outside surface of that squeeze plate to hold the end in place. The first portion 19 of each hook member extends at right angles to its respective squeeze plate across the space between the squeeze plates, Each squeeze plate has two holes 21 and 22 lying on a center line 23 of the squeeze plate with the hole 21 closer to the end 12 of the squeeze plate. The hook portion 17 thus extends through the holes 21 of the squeeze plates 10 and 11 and has its end 20 spot welded to the squeeze plate 10 and its other end passing through the hole 21 in the squeeze plate 11.

Similarly, the hook member 18 has its end 20 passing through the hole 22 in the squeeze plate 11 and is spot welded there too. The other end of the hook member 18 passes through the hole 22 in the squeeze plate 10 as a sliding fit.

Each hook member has at its other end a hook portion 23 located outwardly of the other of the squeeze plates with the hook portion turned toward the end 12 so as to extend partly beyond the end 12 with the hook portions lying in the plane defined by the center line 23 of the squeeze plates.

A coil spring 25 is wrapped around the first straight portions 19 of the two hook member 17 and 18 so that ends of the spring press against the inside surfaces of the squeeze plates and holds the squeeze plates apart. The squeeze plates move outwardly under the pressure from the spring 25 to a position in which the ends 12 of the squeeze plates engage the hook portions 23 thus limiting further outward movement of the squeeze plates.

The squeeze plates are maintained in parallel space position at right angles to the two straight portions of the hook members 17 and 18 by the fact that each squeeze plate is constrained by its engagement with the two straight portions of the hook members. Thus the squeeze plates are maintained in aligned position since they cannot twist about the axis of either of straight portions of the hook members and the squeeze plates are maintained at right angles to the straight portion of the hook members by the welding of the ends 20.

Two further hook members 28 and 29 are mounted on the squeeze plates 10 and 11 respectively. Each of the hook members 28 and 29 comprises a first portion 30 which extends vertically upwardly along the outside surface of the respective squeeze plate and then is turned at right angles across one side edge of the squeeze plate to extend at right angles to the squeeze plate toward the other of the squeeze plate. The length of the portions 30 is greater than one half of the distance between the two squeeze plates so that a center section of each of the portions 30 overlaps centrally of the squeeze plates. At the free end of each of the portion 30 is provided a hook portion 31 which turned upwardly and back toward the respective squeeze plate. The hook portions 31 thus lie in a plane at right angles to the squeeze plates and part way along the squeeze plates between the ends 12 and 13. The hook portions 31 are thus positioned on one side of the squeeze plates and face outwardly from that side.

Figure 2:
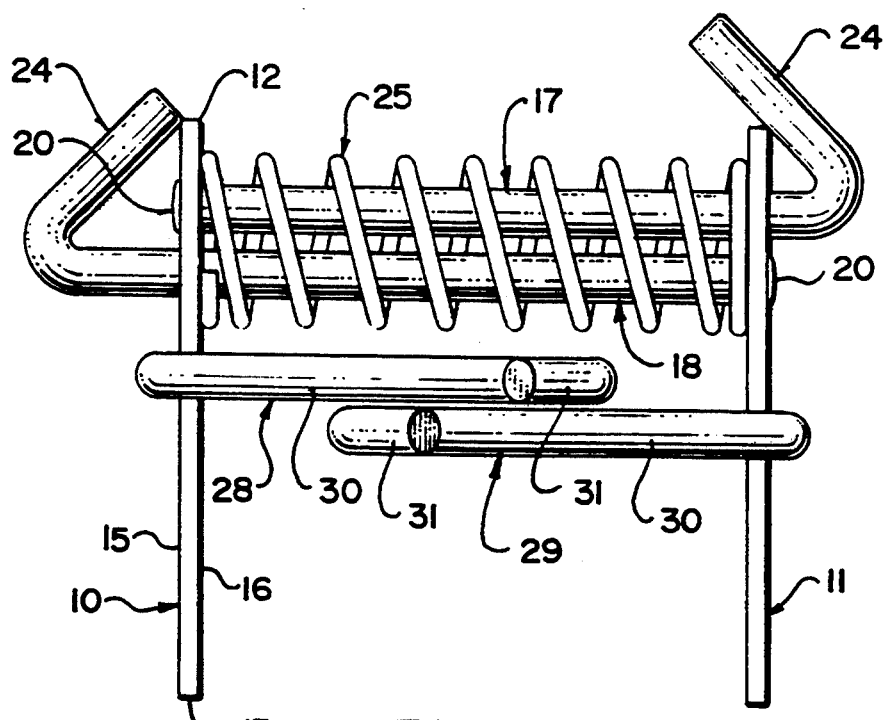
FIG. 2 is a top plan view of the safety clamp of FIG. 1 showing the clamp in a relaxed initial position.

The relaxed position of the safety clamp is shown in FIGS. 1 and 2 in which the squeeze plate are at their maximum spaced position in engagement with the hook portions 23.

Figure 3:
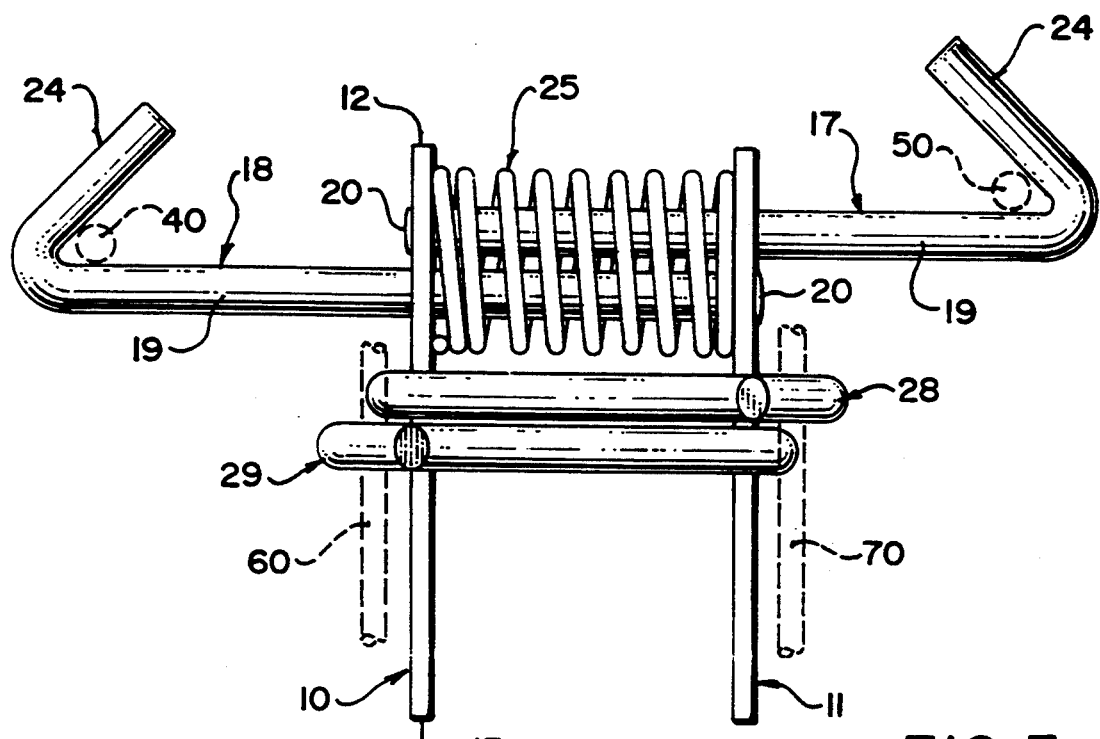
FIG. 3 is a similar top plan view of the safety clamp of FIG. 1 showing the safety clamp in a second position after operation of the squeezing action to increase the spacing between the hook portions for engaging over the trap wires of an animal trap.

In order to engage the safety clamp over two wires of an animal trap, the operator grasps the squeeze plate manually in one hand and squeezes the plates together thus compressing the spring 25. This position is shown generally in FIG. 3 although of course the amount of compression will vary as required by the operator. This compression squeezes together the ends 20 of the hook members 17 and 18 so that the hook portions of those hook members move apart as shown in FIG. 3. This allows the hook members to be moved apart to a sufficient extent to engage around two wires 40 and 50 of an animal trap. The remainder of the animal trap is of course not shown as this will be known to one skilled in the art and designs can of course vary.

Once the hook portions 23 are engaged over the wires 40 and 50, the safety clamp can be release and the spring pressure from the spring 25 pushes the hook portions together thus clamping the clamp around the wires 40 and 50. Should the trap inadvertently actuate, the wires 40 and 50 move rapidly apart thus pulling the hook portions 23 apart until the squeeze plates are drawn together sufficiently to compress the spring until it will not compress any further where upon the squeeze plates halt any further movement of the hook portions and prevent the wires 40 and 50 moving to a fully actuated position which could trap the hands or other body parts of the operator.

The hook portions 23 are spaced relatively widely in order to accommodate particular types of trap in which the wires 40 and 50 are equally widely spaced. In an alternative designs of trap, the wires are closer together and these are shown schematically at 60 and 70 and for these closer wires, the hook portions 31 are used which are of course more closely spaced in view of the fact that they are between the squeeze plates rather than outside the squeeze plates. The same mode of operation is used in which the squeeze plates are drawn together to increase the spacing between the hook portions 31 sufficiently to engage over the wires 60 and 70 where upon the clamp is released and remains in position on the wires preventing their inadvertent movement apart should the trap be actuated.

The clamp remains in place while the trap is set and moved to its required position and the trigger delicately at its required operating position. When the trap is set, the operator can grasps the squeeze plates, squeeze the squeeze plates together to increase the spacing between the hook portions and then to release the hook portions from the wires while at all times retaining the squeeze plates and the hand of the user away from the position between the wires to avoid any possibility of entrapment should the trap inadvertently actuate while the clamping device is removed.

The simple design of the device using the flat squeeze and the positioning of the hook portions relative to the squeeze plates enables the device to be simply and readily operated by the operator even when wearing heavy mitts. The device is compact so that can be readily stored in a pocket or the like. The device is manufactured from a very simply element of a minimum of moving parts and maintains the hook portions properly aligned and located to grasp over the wires when required.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A safety clamp for mounting on an animal trap to hold the trap against in advertent actuation while the trap is being set, the safety clamp comprising a first squeeze plate, a second squeeze plate, the first and second squeeze plates being mounted in spaced generally parallel arrangement for movement together in a squeezing action effected by manual pressure on outside surfaces of the squeeze plates, a first hook member, a second hook member, each of the hook members having a first portion with one end of the first portion attached to an inside surface of a respective one of the squeeze plates and with the first portion extending substantially at a right angle to the respective squeeze plate across the space between the squeeze plates through an opening in the other of the squeeze plates, and each hook member having a hook portion at an end thereof opposite said one end so that the hook portion is arranged on a side of the other squeeze plate opposite said respective squeeze plate such that said squeezing action moves said one ends of the hook members together to increase the spacing between the hook portions for engaging over portions of the trap, and spring means biasing the squeeze plates apart against the squeezing action.

2. The safety clamp according to claim 1 wherein the spring means comprises a coil spring wrapped around said first portions between the squeeze plates.

3. The safety clamp according to claim 1 wherein the squeeze plates each comprise an elongate body having first ends which are substantially aligned and second ends spaced away from the first ends for manual grasping and wherein the hook members are arranged adjacent said first ends of the squeeze plates with the hook portions there of extending outwardly from said first ends away from said second ends.

4. The safety clamp according to claim 3 wherein the first portions of the hook members are arranged substantially on a center line of each squeeze plate extending longitudinally of the squeeze plate.

5. The safety clamp according to claim 4 wherein one of the first portions is arranged closer to the first ends than the other of the other of the first portions.

6. The safety clamp according to claim 1 wherein each of the squeeze plates comprises a substantially flat plate.

7. The safety clamp according to claim 1 wherein each squeeze plate carries a respective one of the third and fourth hook members, each of the third and fourth hook members having a first portion attached to a respective one of the squeeze plates and extending toward the other of the squeeze plate and a hook portion at an end of the first portion remote from the respective squeeze plate such that the hook portions face toward the respective squeeze plate with the hook portion overlap between the squeeze plates to define an area between the hook portions which is narrower than the space between the squeeze plates such that said squeezing action moves the hook portion of the third and fourth hook members apart to increase the spacing there between.

8. The safety clamp according to claim 7 wherein the third and fourth hook members are arranged on one side of the squeeze plates.

9. The safety clamp according to claim 8 wherein the squeeze plates are substantially elongate with the first and second hook members arranged at one end thereof and the third and fourth hook members arranged on one side of the squeeze plates at a position part way there along such that a manually graspable portion of the squeeze plates extends from the third and fourth hook members to a second end of the squeeze plate remote from the first end.

10. The safety clamp according to claim 8 wherein the hook portions of the third and fourth hook members lie in a plane at right angles to the length of the squeeze plates and extend outwardly to one side thereof.

* * * * *